(12) United States Patent
Tiirola et al.

(10) Patent No.: US 11,191,011 B2
(45) Date of Patent: Nov. 30, 2021

(54) MANAGING CONTROL CHANNEL BLIND SEARCHES BETWEEN SEARCH SPACES IN NEW RADIO

(71) Applicant: NOKIA TECHNOLOGIES OY, Espoo (FI)

(72) Inventors: Esa Tiirola, Kempele (FI); Volker Braun, Stuttgart (DE); Karol Schober, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 542 days.

(21) Appl. No.: 15/815,106

(22) Filed: Nov. 16, 2017

(65) Prior Publication Data

US 2019/0150073 A1    May 16, 2019

(51) Int. Cl.
*H04W 4/00* (2018.01)
*H04W 48/16* (2009.01)
(Continued)

(52) U.S. Cl.
CPC .......... *H04W 48/16* (2013.01); *H04L 5/0053* (2013.01); *H04W 72/042* (2013.01);
(Continued)

(58) Field of Classification Search
CPC .......... H04W 72/042; H04W 72/0446; H04W 84/042; H04W 48/16; H04W 72/1289; H04W 48/12
(Continued)

(56) References Cited

U.S. PATENT DOCUMENTS 8,687,584 B2 * 4/2014 Yang ............... H04L 5/0053
370/329
9,155,093 B2 * 10/2015 Oizumi ............... H04L 5/001
(Continued)

FOREIGN PATENT DOCUMENTS

CN       101119277 A    2/2008
CN       101389106 A    3/2009
(Continued)

OTHER PUBLICATIONS

European Office Action corresponding to Appln. No. 18204477.6, dated Mar. 21, 2019.
(Continued)

*Primary Examiner* — Joseph Arevalo
(74) *Attorney, Agent, or Firm* — Squire Patton Boggs (US) LLP

(57) ABSTRACT

Systems, methods, apparatuses, and computer program products for managing or monitoring of the control channel in new radio (NR) through blind searches are provided. One method may include configuring, by a network node, multiple search spaces, sets of search spaces, and/or control resource sets, to a user equipment, that results in monitoring occasions where more blind decodings are required than allowed by capability of the user equipment. The method may further include identifying the monitoring occasions for which an allowed number of blind decodings is exceeded, determining a reduced set of blind decodings and/or candidates determined by predefined search space priorities or rules, and transmitting physical downlink control channel(s) to the user equipment given the reduced set.

20 Claims, 5 Drawing Sheets

(51) Int. Cl.
*H04W 72/10* (2009.01)
*H04W 72/04* (2009.01)
*H04L 5/00* (2006.01)

(52) U.S. Cl.
CPC ......... *H04W 72/044* (2013.01); *H04W 72/10* (2013.01); *H04L 5/0007* (2013.01)

(58) Field of Classification Search
USPC ........ 455/434, 423, 94.2, 174, 509, 70, 450, 455/550.1
See application file for complete search history.

(56) References Cited

U.S. PATENT DOCUMENTS

| | | | |
|---|---|---|---|
| 2011/0292891 A1 | 12/2011 | Hsieh et al. | |
| 2012/0281566 A1 | 11/2012 | Pelletier et al. | |
| 2013/0077590 A1 | 3/2013 | Xue et al. | |
| 2013/0155868 A1* | 6/2013 | Seo .................. | H03M 13/3723 370/241 |
| 2013/0250880 A1 | 9/2013 | Liao et al. | |
| 2014/0105154 A1* | 4/2014 | Yang .................... | H04L 5/0053 370/329 |
| 2014/0126484 A1 | 5/2014 | Chen et al. | |
| 2015/0181577 A1* | 6/2015 | Moulsley ............ | H04L 5/0053 370/329 |
| 2015/0264665 A1 | 9/2015 | Vos et al. | |
| 2015/0271790 A1* | 9/2015 | Lee ..................... | H04W 48/16 455/450 |

FOREIGN PATENT DOCUMENTS

| | | |
|---|---|---|
| CN | 101699901 A | 4/2010 |
| CN | 101841892 A | 9/2010 |
| CN | 102264135 A | 11/2011 |
| CN | 102801503 A | 11/2012 |
| CN | 107295685 A | 10/2017 |
| CN | 107295685 B | 11/2020 |
| RU | 2 575 391 C2 | 2/2016 |
| WO | 2013/017946 A2 | 2/2013 |
| WO | WO 2014/065584 A1 | 5/2014 |

OTHER PUBLICATIONS

Huawei et al., "Search space design", 3GPP TSG RAN WG1 Meeting #89, Hangzhou, China, May 15-19, 2017, R1-1706944, 4 pages.
Huawei et al., "UE procedure of PDCCH monitoring for URLLC", 3GPP TSG RAN WG1 NR Meeting #90bis, Prague, Czech Republic, Oct. 9-13, 2017, R1-1717084, 5 pages.
Russian Office Action corresponding to Appln. No. 2018138486, dated Mar. 21, 2019.
Russian Search Report corresponding to Appln. No. 2018138486, dated Mar. 20, 2019.
European Office Action corresponding to EP Appln. No. 18 204 477.6, dated Jan. 2, 2020.
First Office Action dated Feb. 1, 2021 corresponding to Indian Patent Application No. 201844037813.
Samsung: "Search Space Design," 3GPP R1-1702973, 3GPP TSG RAN WG1 #88, Athens, Greece, Feb. 13-17, 2017.
Communication pursuant to Article 94(3) EPC dated Mar. 12, 2020 corresponding to European Patent Application No. 18204477.6.
Communication pursuant to Article 94(3) EPC dated Mar. 11, 2021 corresponding to European Patent Application No. 18204477.6.
Notification of the First Office Action dated May 26, 2021 corresponding to Chinese Patent Application No. 2018113620091, with English summary.
European Communication pursuant to Article 94(3) EPC, corresponding to EP Appln. No. 18 204 477.6, dated Apr. 30, 2020.

* cited by examiner

MANAGING CONTROL CHANNEL BLIND SEARCHES BETWEEN SEARCH SPACES IN NEW RADIO

BACKGROUND

Field

Embodiments of the invention generally relate to wireless or cellular communications networks, such as, but not limited to, the Universal Mobile Telecommunications System (UNITS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate, for example, to the monitoring of the control channel in NR that may be carried out by means of blind searches.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method including configuring, by a network node, multiple search spaces, sets of search spaces, and/or control resource sets, to a user equipment, that results in monitoring occasions where more blind decodings are required than allowed by capability of the user equipment. The method may also include identifying the monitoring occasions for which an allowed number of blind decodings is exceeded, determining a reduced set of blind decodings and/or candidates, and transmitting physical downlink control channel(s) to the user equipment on the reduced set of blind decodings or candidates. The reduced set of blind decodings and/or candidates are determined by predefined search space priorities or rules.

Another embodiment is directed to an apparatus including at least one processor and at least one memory comprising computer program code. The at least one memory and computer program code configured, with the at least one processor, to cause the apparatus at least to configure multiple search spaces, sets of search spaces, and/or control resource sets, to a user equipment, that results in monitoring occasions where more blind decodings are required than allowed by capability of the user equipment. The at least one memory and computer program code may be further configured, with the at least one processor, to cause the apparatus at least to identify the monitoring occasions for which an allowed number of blind decodings is exceeded, to determine a reduced set of blind decodings and/or candidates, and to transmit physical downlink control channel(s) to the user equipment on a reduced set of blind decodings or candidates. The reduced set of blind decodings and/or candidates are determined by predefined search space priorities or rules.

Another embodiment is directed to a method including receiving, by a user equipment, configuration of blind decodings or candidates on multiple search spaces, sets of search spaces and/or control resource sets that results in monitoring occasions where a number of required blind decodings exceeds a capability of the user equipment. The method may also include identifying the monitoring occasions for which the blind decoding capability of the user equipment is exceeded and reducing the set of blind decodings or candidates based on predefined search space priorities or rules, and receiving, by the user equipment, PDCCH(s) given the reduced set of blind decodings or candidates.

Another embodiment is directed to an apparatus including at least one processor and at least one memory comprising computer program code. The at least one memory and computer program code configured, with the at least one processor, to cause the apparatus at least to receive configuration of blind decodings or candidates on multiple search spaces, sets of search spaces or control resource sets that results in monitoring occasions where a number of required blind decodings exceeds a capability of the user equipment. The at least one memory and computer program code may be further configured, with the at least one processor, to cause the apparatus at least to identify the monitoring occasions for which the blind decoding capability of the user equipment is exceeded and reduce the set of blind decodings or candidates based on predefined search space priorities or rules, and to receive PDCCH(s) given the reduced set of blind decodings or candidates.

BRIEF DESCRIPTION OF THE DRAWINGS

For proper understanding of the invention, reference should be made to the accompanying drawings, wherein.

DETAILED DESCRIPTION

Figure 1:
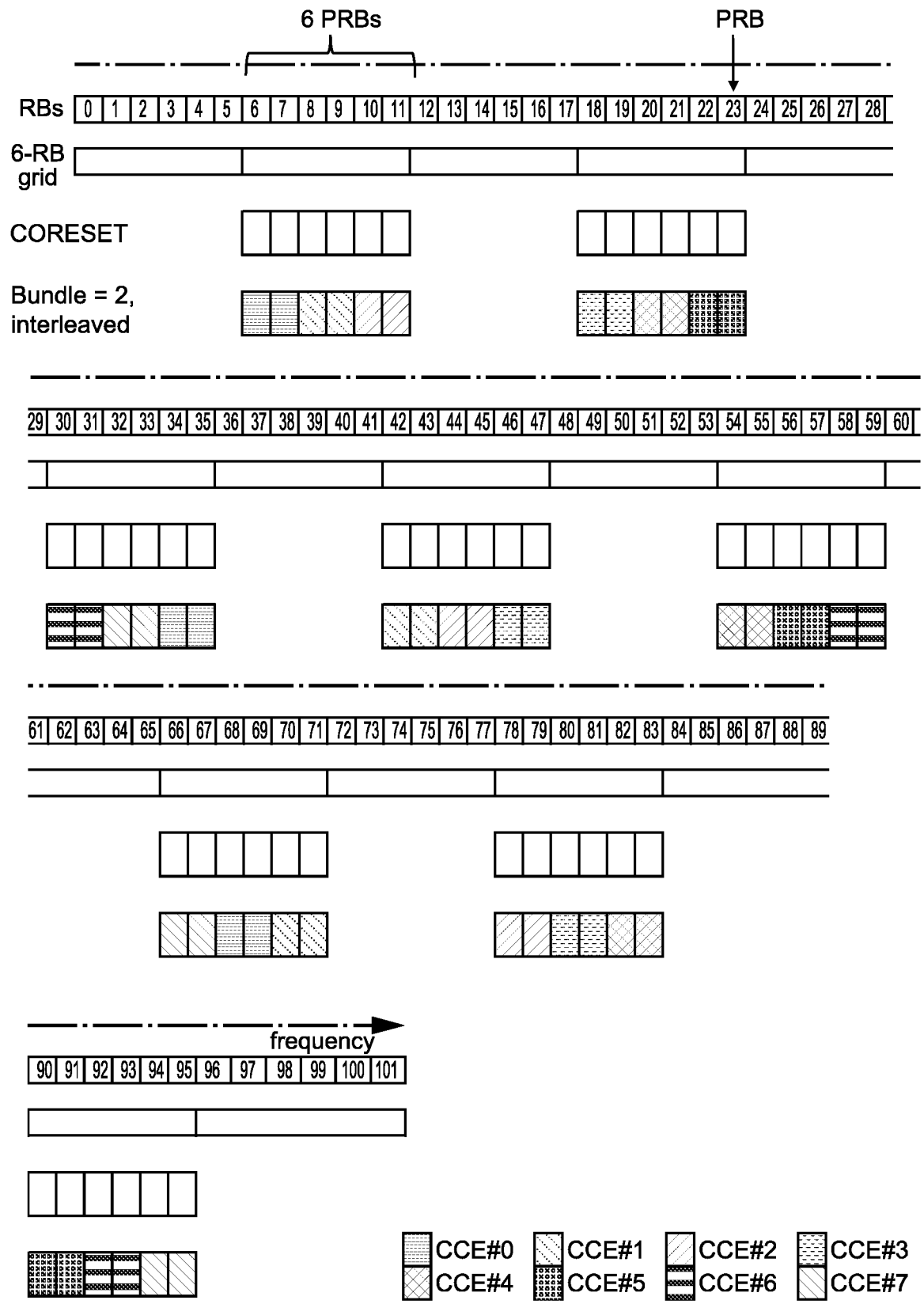
FIG. 1 illustrates an example control channel (PDCCH) mapping.

It will be readily understood that the components of the invention, as generally described and illustrated in the figures herein, may be arranged and designed in a wide variety of different configurations. Thus, the following detailed description of the embodiments of systems, methods, apparatuses, and computer program products for managing or monitoring of the control channel in new radio (NR) through blind searches, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, teachings and embodiments of this invention, and not in limitation thereof.

NR physical downlink control channel (PDCCH) may be used to convey downlink control information (DCI). It may utilize OFDM waveform and polar coding. NR PDCCH may utilize every fourth resource element for demodulation reference signaling (DMRS). DCI can be used for downlink (DL) and uplink (UL) resource allocation signaling. It may be used also for other purposes, such as carrier aggregation and bandwidth part (BWP) (de)activation, frame structure indication (Group common PDCCH) and power control updates.

Certain embodiments are directed to the monitoring of the control channel in NR that may be carried out by means of blind searches. An objective may include reducing or containing the processing effort for carrying out the blind searches. Blind search or blind decoding may refer to the process by which a UE finds its PDCCH by monitoring a set of PDCCH candidates in every monitoring occasion. A monitoring occasion can be once a slot, once per multiple slots or multiple times in a slot. In an embodiment, physical downlink control channel (PDCCH) blind search may be arranged by means of parallel search spaces or search space sets mapped to one or multiple control resource sets (CORESETs). During a PDCCH blind search, a UE may be monitoring predefined control channel elements (CCEs), aggregated CCEs and/or downlink control information (DCI) sizes in predefined time instants, corresponding to configured monitoring occasions.

CCEs may be arranged within a predefined CORESET configured via higher layer signalling. Each CCE may include 6 REGs (e.g., 12 subcarriers within 1 OFDM symbol), and 1, 2 or 3 REG bundles. REG bundles may be mapped into the CORESET either using interleaved or non-interleaved mapping. The UE may assume that REG bundle defines the precoder granularity in frequency and time used by gNB when transmitting PDCCH. CORESET resources may be configured in units of 6 resource blocks in the frequency. FIG. 1 illustrates an example PDCCH mapping assuming 1 symbol CORESET, interleaved REG-to-CCE mapping and REG bundle size 2. Table 1 below lists the REG bundle sizes options in terms of REGs, supported by new radio (NR).

TABLE 1

| CORESET length (#symbols) | Non-interleaved mapping (REG bundle: frequency × time) | Interleaved mapping (REG bundle: frequency × time) |
| --- | --- | --- |
| 1 | 6 (6 × 1) | 2 (2 × 1), 6 (6 × 1) |
| 2 | 6 (3 × 2) | 2 (1 × 2), 6 (3 × 2) |
| 3 | 6 (2 × 3) | 3 (1 × 3), 6 (2 × 3) |

Certain working assumptions and agreements have been made in 3GPP RAN1 working group meetings with respect to control channel blind search. For example, in the case when only CORESET(s) for slot-based scheduling is configured for a UE, the maximum number of PDCCH blind decodes per slot per carrier is X, where the value of X does not exceed 44. It remains for further consideration as to the exact value of X, as for multiple active BWP, for multiple TRP, for multiple carriers, for multi beams, for non-slot based scheduling, and as to numerology specific X.

Some further agreements or working assumptions have been made in 3GPP with respect to BD capabilities. Some of these agreements may include: PDCCH candidates having different DCI payload sizes count as separate blind decodes, PDCCH candidates comprised by different sets of CCE(s) count as separate blind decodes, PDCCH candidates in different CORESETs count as separate blind decodes, PDCCH candidates having the same DCI payload size and comprised by the same set of CCE(s) in the same CORESET count as one blind decodes.

It has also been agreed that, for non-CA and for PDCCH monitoring periodicity of 14 or more symbols, the maximum number of PDCCH blind decodes per slot may be: 44 for SCS=15 kHz, and less than 44 at least for SCS=60 kHz and 120 kHz. For a given SCS, all UEs may support the maximum number of PDCCH blind decodes per slot.

For CA with up to N CCs, the maximum number of PDCCH blind decodes per slot for a UE may depend on the number of configured CCs. All UEs supporting CA with the same set of CCs may support the same maximum number of PDCCH blind decodes. For CA with more than N CCs, the maximum number of PDCCH blind decodes for a UE depends on the explicit UE capability.

In a given CORESET, two types of search spaces (e.g., UE-common search space and UE-specific search space) or even search spaces of the same type can have different periodicities of monitoring occasions for a UE. The details of the corresponding search spaces have yet to be determined. However, in NR, a search space can be referred as a set of search spaces. One set of the following parameters may determine a set of search spaces: a set of aggregation levels, the number of PDCCH candidates for each aggregation level, and/or PDCCH monitoring occasion for the set of search spaces. At least for cases other than initial access, to identify a set of search spaces, the following parameters may be configured by UE-specific RRC signaling: the number of PDCCH candidates for each aggregation level of {1, 2, 4, 8, [16]}—one value from {0, 1, 2, 3, 4, 5, 6, 8} candidates, PDCCH monitoring occasion for the set of search spaces—one value of from {1-slot, 2-slot, [5-slot], [10-slot], [20-slot]} (at least 5 values) and/or one or more value(s) from $1^{st}$ symbol, $2^{nd}$ symbol, . . . , $14^{th}$ symbol within a monitored slot, and each set of search spaces associates with a CORESET configuration by RRC signaling. While periodicity is defined per set of search spaces in NR, the periodicity could be defined per search space corresponding to candidates of a single AL.

As can be seen from the discussion above, in NR, the UE may be configured to monitor a set of search-spaces in a downlink DL CORESET with a certain periodicity, and the UE may be configured to monitor one or multiple sets of search spaces in one or multiple such CORESETs, each CORESET possibly configured with different periodicities and/or each set of search space sets possibly configured with different periodicities of monitoring occasions. For example, a UE may be configured to monitor a first CORESET with 0.5 ms (e.g., 1 slot with 30 kHz SCS) periodicity for eMBB service and a second CORESET with 5 ms (e.g., 10 slots with 30 kHz SCS) periodicity for MTC service. In a similar scenario, the same CORESET may be configured with multiple search spaces, the search spaces having different periodicities of monitoring occasions, such as a user-specific set of search spaces with 0.5 ms (e.g., 1 slot with 30 kHz SCS) periodicity and a user-common set of search spaces with 5 ms (e.g., 10 slots with 30 kHz SCS) periodicity. There may also be search space sets which are monitored multiple times during a slot, e.g., two or seven times per slot. These monitoring occasions may be defined for non-slot based scheduling (mini-slots). An example service using non-slot based scheduling is Ultra Reliable Low Latency Communications (URLLC).

A problem arising from the monitoring of multiple sets of search spaces is that the processing load required for the blind searches is time-variant. In particular, this processing load can exhibit peaks that it may be desired to contain or minimize. In the examples above, such processing peaks may occur every 5 ms when both CORESETs (or sets of search spaces) need to be monitored simultaneously. Generally, it may be desirable to allow over-booking of the blind decodings (BDs) for some time instances, since, for a majority of time instances, the BDs would be below the maximum allowed. This would allow dimensioning the BDs on different search spaces and/or sets of search spaces according to typical number of BDs, instead of the maximum number of BDs.

Therefore, an embodiment is configured to manage PDCCH BDs between multiple sets of search spaces or CORESETs. In one embodiment, when it is determined that a UE runs out of a predefined maximum number of BDs (such as 44 BDs/slot), the number of BDs may be reduced down to an allowed level. Certain embodiments can scale to different scenarios, such as a different number of sets of search spaces, different number of BD capability, different combinations of slot based and non-slot based scheduling, and/or different combinations of carrier aggregation and bandwidth parts. Additionally, embodiments generally involve minimal signaling.

It is noted that, within a single control monitoring occasion, a UE may be configured to monitor by means of blind searches: one or multiple control resource sets, one or multiple search spaces within a control resource set, one or multiple aggregation levels (i.e., repetition coding levels, or code rates more generally) within a search space, one or multiple decoding candidates (i.e., possible resource allocations) per aggregation layer, or one or multiple DCI format sizes (i.e., DCI payload size and message content) per decoding candidate with one or multiple RNTIs. A blind search may also involve soft combining (in case of aggregation levels>1), demodulation, decoding and user-specific CRC check.

In LTE, the set of search spaces is referred to simply as a search space and there is a single CORESET in LTE. The number of candidates per LTE search space is predefined in the 3GPP specifications (e.g., in section 9 of 3GPP TS36.213). With user-specific search space (USS), the number of blind searches is (6, 6, 2, 2) with aggregation levels (1, 2, 4, 8). With common search space (CSS), the number of blind searches is (4, 2) with aggregation levels (4, 8). The number of blind searches may scale with the number of DCI format sizes a UE follows. Typically, 2 format sizes on USS and 1 format size on CSS. This may typically result in 2×16+2×6=44 blind decodes.

However, when configuring multiple CORESETs (or sets of search spaces) with different monitoring periodicities, the LTE approach of using a predefined number of blind searches per aggregation level per CORESET (or search space) would lead to processing load peaks at times where the monitoring occasions occur simultaneously (e.g., during the same slot or mini-slot). Therefore, it may be desirable to design methods for containing or reducing the blind search processing peaks when monitoring occasions of different CORESETs (or sets of search spaces) collide.

LTE supports PDCCH candidate reduction, but the reduction is configured in a semi-static manner per serving cell, by means of direct scaling of PDCCH candidates on different aggregation level and it does not take into account NR scenario where overbooking occurs in a dynamic manner. One solution would be to restrict a NR gNB to configure at most X blind decodes (e.g., X=44 BDs) across all time instances. However, this solution may be too restrictive, as the BD peaks would only seldom occur. A consequence of this approach would be that a UE's BD capacity would be underutilized for most of the time. This would create additional PDCCH blocking, and would reduce the quality of experience (data rate, latency).

Certain embodiments are directed to managing and/or controlling PDCCH blind decodings (BDs) between multiple search spaces or sets of search spaces, or CORESETs. In one embodiment, the managing of the BDs may include, when a UE reaches the predefined maximum number of BDs/reference time unit (such as 44 BDs/slot), predefined rules are provided for how to reduce the number of BDs down to an allowed level. The reference time unit may vary according to the scenario. It may be one slot, or multiple slots, or one OFDM symbol, or multiple OFDM symbols. Another option is to determine it in terms of absolute time (such as 0.5 ms). The predefined rule(s) allow the UE (and/or network) to prioritize the BDs on different search space types (such as USS or CSS) and/or search space sets dynamically, in a configurable and well-defined manner.

In an example embodiment, each BD candidate (or at least those BD candidates which may be dropped in certain circumstances) may be assigned a priority number. Then, when there is a need to reduce the number of BDs, the BDs may be reduced according to the BD priority number and according to the predefined search space (set) and/or search space type priorities/rules.

Some embodiments may provide at least two approaches for the BD reduction. In one approach, BD reduction/dropping may be done jointly over BDs in multiple search spaces (or search space set, or CORESET). According to another approach, BD reduction/dropping may be carried out sequentially in different search spaces (or search space set, or CORESET). According to this approach, BDs may be reduced first from the search space with the smallest search-space (set) priority, and, if this is not enough, BDs may also be reduced from the search space with the second lowest search-space (set) priority (and so forth). In one embodiment, a maximum number of BD reduction (number or %) per search space (or search space set, or CORESET) may be defined to maintain the scheduling capability in all search spaces. This may be a configuration parameter, or it may be defined by standard. For both approaches discussed above, dropping can be based on a defined BD priority number, $p_{pd}$.

Thus, according to certain embodiments, the BD dropping/reduction may be based on the BD priority number. In one embodiment, the BD priority number, $p_{bd}$, within an aggregation level of the search space (or search space set or CORESET) may depend on the total number of BDs per aggregation level within the search space. According to this approach, a BD priority number may be defined according to the following equation:

$$p_{bd}(SS, AL) = \alpha(SS, AL) \frac{BD \text{ index } (SS, AL)}{\text{Number of } BDs \ (SS, AL)},$$

where the BD index (SS, AL) is the BD index within the search space or search space set (SS) and aggregation level (AL). In one embodiment, the BD index may vary between [1, 2, Number of BDs (SS,AL)], which means that priority numbers vary between 0 and 1 ($0 < p_{bd}(SS, AL) \leq 1$). Also, it is noted that $\alpha(SS, AL)$ represents a priority scaler, which can be additionally configured.

In one embodiment, the order of dropping BD candidates may be defined according to the BD priority number, $p_{pd}(SS, AL)$. For example, the dropping of BD candidates may follow one of the two approaches discussed above in which the dropping may be done jointly over BDs in multiple search spaces (or search space sets) or done sequentially in different search spaces (or search space sets). In another embodiment, the required number of BDs may be dropped according to those with the lowest BD priority number(s). The required number may depend on the actual number of BDs—the total number of BDs (defined for certain time period). If multiple BDs have the same BD priority number, then the BD with the lowest search-space (set) priority may be dropped.

According to some embodiments, search-space (set) priority may be defined according to different criteria, for example, including: priority order according to aggregation level, priority order between search spaces (or search space sets, or CORESETs), priority order according to BD search space type, i.e., slot base operation or non-slot based operation, priority order according to DCI size, and/or priority order according to radio network temporary identifier (RNTI) associated with the search space set.

Certain embodiments may define a priority order according to component carrier and/or bandwidth part. For example, these criteria may be considered according to the following predefined order: (1) AL considered first, (2) scheduling type (slot vs. non-slot) priority considered second, (3) search space set priority considered third, and (4) component carrier priority considered fourth.

Based on the foregoing, it can be seen that certain embodiments may facilitate an overbooking solution where the number of BDs/candidates may be reduced to a certain predefined (allowed) level based on a BD priority number as well as search space (set) priorities/rules that are followed by both UE(s) and gNB(s). Note the relation between PDCCH candidate and BD is given by number of DCI format size hypothesis a UE is configured to monitor within a single candidate. One embodiment is directed to defining two sets of BDs/candidates, an allowed set and a non-allowed set. The non-allowed set of BDs/candidates may be defined based on the lowest BD/candidate priorities, and, in some embodiments, the size of the non-allowed set may also be zero. Accordingly, in an embodiment, the BD priorities may be defined according to the search space (set) priorities and predefined rules.

According to certain embodiments, the maximum number of BDs may vary according to the scenario. For example, in some embodiments, the maximum number of BDs may be defined separately for different scenarios, including slot based scheduling, non-slot based scheduling (i.e. mini-slot scheduling), and slot based plus non-slot based scheduling. For slot based scheduling, the number of BDs may be defined, for example, as X BDs/slot/carrier (or bandwidth part) for one numerology. For non-slot based scheduling, the number of BDs may be defined, for example, as Y BDs/mini-slot (or symbol) for one numerology. For slot based+non-slot based scheduling, the number of BDs may be defined, for example, as Z BD/slot for one numerology. In certain embodiments, the parameters X, Y, Z may depend on the UE category.

Figure 2:
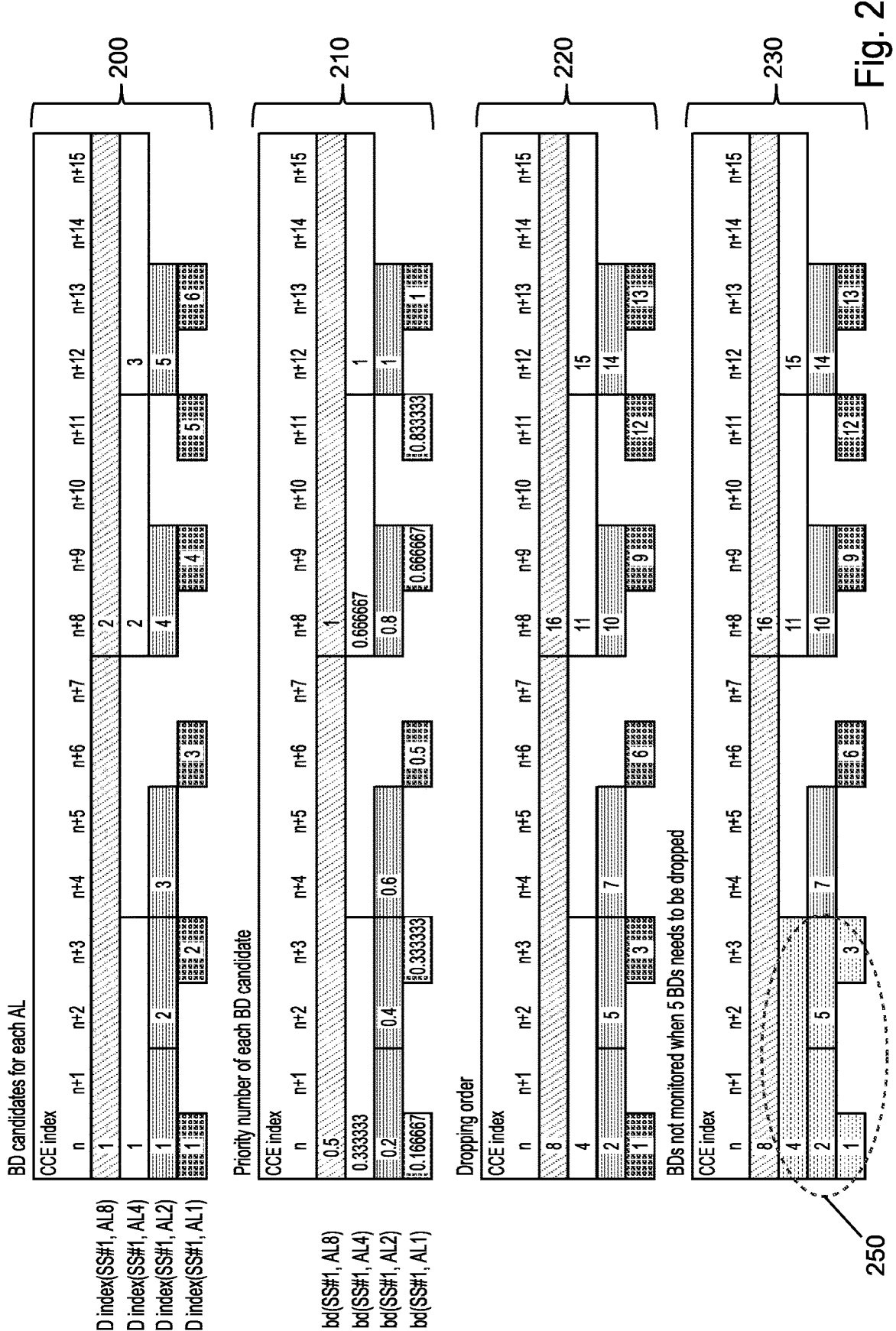
FIG. 2 illustrates an example block diagram for how to determine the dropping order of blind decodings (BDs), according to certain embodiments.

FIG. 2 illustrates an example block diagram for how to determine the dropping order of BDs/candidates, according to certain embodiments. In this example, we assume for simplicity that there is single BD per one candidate. As illustrated in the example of FIG. 2, as shown at 200, BD candidates of a AL are assigned with BD (SS, AL) number according to CCE index: 1, 2, . . . , Number of BD (SS, AL). In this example, the total number of BD candidates in the search space set is Number of BDs (SS,AL)=16 BDs, where there are: (a) 6 BD candidates with AL1, (b) 5 BD candidates with AL2, (c) 3 BD candidates with AL4, and (d) 2 BD candidates with AL8. As shown at 210, the BD candidate priority number $p_{bd}$ (SS, AL) is computed. The dropping order may be determined, as shown at 220, based on the priority number, from the smallest to largest value. In this example, as shown at 230, 5 BD candidates may be dropped. In an embodiment, it is assumed that search-space (set) priority increases with aggregation level. According to this example, the dropped candidates 250 are not monitored at all in the current search space.

According to an embodiment, the search space (set) priorities may be configured by RRC. This approach may be used, for example, between different search spaces configured by RRC. Another embodiment is to define search space (set) priorities according to predefined rules. In an embodiment, predefined rules may be applied only if the priority number for multiple BDs is the same on multiple search spaces (sets). For example, common search space may have higher priority compared to user specific search space. An additional or complimentary approach may include to derive priorities between different search spaces according to monitoring periodicity. For instance, a search space with higher periodicity may have higher priority compared to a search space with lower priority. In one embodiment, a higher aggregation level may have higher priority compared to a lower aggregation level. In another embodiment, search spaces involved to non-slot based scheduling may have higher priority compared to slot based scheduling.

In some embodiments, search space (set) priorities related to different component carriers may be derived implicitly, for example, based on cell_ID. Similar search space (set) priorities may also be derived for search spaces related to different bandwidth parts or CORESETS. All or some available IDs such as CORESET ID, search space (set) ID and so forth may be used for the prioritization purposes.

According to other embodiments, in addition to search space priorities, it is possible to define or configure that certain BDs are never dropped. For example, in some embodiments, it may be defined that CSS is never dropped, and/or may be defined that certain ALs (such as the highest AL is never dropped).

In the example of FIG. 2, the priority metric on which the dropping decision is made is given directly by the priority number, α(AL, SS)=1. Following this principle, predefined rules may be applied in the cases when the priority number for multiple BDs is the same on multiple search spaces (sets). However, a more generic priority metric may involve weighting factors/vectors to implement the search-space (set) priority, for example when applied to ALs, a weight vector α(ALs, SS)=(1, 1, 1, 1) would result in equal search space (set) priorities for ALs (1, 2, 4, 8) while α(AL, SS)=(0.8 0.8 1.2 1.2) would give higher search-space (set) priority (lower dropping probability) to ALs 4 and 8. In other embodiments, instead of dropping the BDs having the lowest priority metric, also BDs with the highest priority metric may be dropped. This is similar to reducing the number of BDs per AL and may lead to a simpler implementation.

Figure 3A:
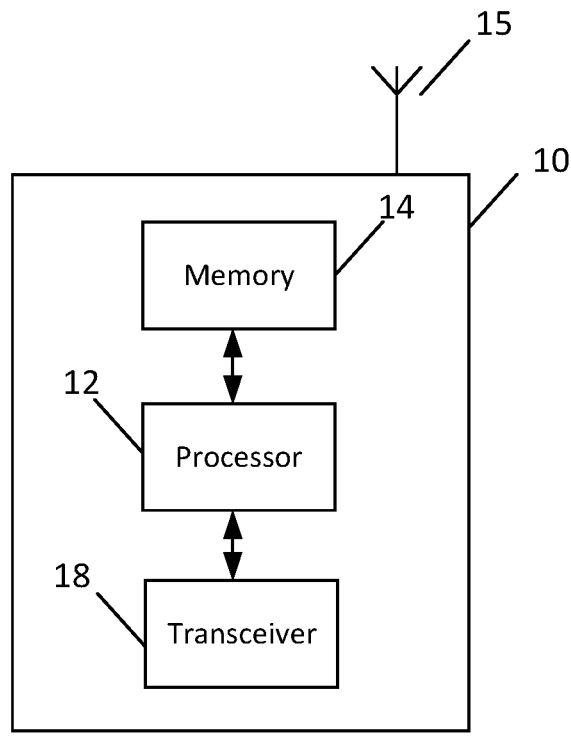
FIG. 3a illustrates a block diagram of an apparatus, according to one embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 3a.

As illustrated in FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultra wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein.

In an embodiment, apparatus 10 may be controlled by memory 14 and processor 12 to control or manage NR control channel (e.g., PDCCH) blind decoding attempts between multiple search spaces or sets of search space(s) or CORESETs based on predefined search space (set) priorities and/or rules. According to one embodiment, apparatus 10 may be controlled by memory 14 and processor 12 to configure multiple search spaces, sets of search spaces, and/or CORESETs, to a UE, that results in monitoring occasions where more BDs are required than the maximum allowed by capability of the user equipment. It is noted that the maximum number of allowed BDs may vary according to the scenario, such as whether the scenario is slot based scheduling, non-slot based scheduling, or slot based+non-slot based scheduling.

In an embodiment, apparatus 10 may also be controlled by memory 14 and processor 12 to identify the monitoring occasions for which an allowed number of blind decodings is exceeded, and to determine a reduced set of blind decodings and/or candidates. According to certain embodiments, apparatus 10 may also be controlled by memory 14 and processor 12 to transmit physical downlink control channel(s) to the UE given the reduced set of blind decodings and/or candidates. The reduced set of blind decodings and/or candidates may be determined by the predefined search space (set) priorities and/or rules. The predefined search space (set) priorities and/or rules may include rules configured to dynamically prioritize the blind decoding attempts on different ones of the multiple search spaces or search space sets or CORESETs.

For example, in one embodiment, when the maximum number of allowed blind decoding attempts is reached, the BDs may be reduced according to a priority number assigned to each BD and according to the predefined search space (set) priorities and/or rules. In this embodiment, the predefined search space (set) priorities and/or rules may include assigning a priority number to each of the blind decodings and/or candidates that are subject to potential blind decoding reduction, and reducing the number of blind decoding attempts according to the priority number. For instance, in an embodiment, the predefined search space (set) priorities and/or rules may be configured to drop the BD(s) with the lowest priority number(s) until the allowed or desired level is reached, i.e., until the number of BDs is below the predefined maximum threshold of allowed BD attempts. In other embodiments, however, the predefined search space (set) priorities and/or rules may include dropping BD(s) with the highest priority number(s) until the allowed or desired level is reached. If multiple BDs have the same priority number, then the BD with the lowest search-space (set) priority (from among the BDs with the same priority number) may be dropped.

In certain embodiments, a priority number within an aggregation level (AL) of the search space (SS) may depend on a total number of blind decodings and/or candidates per aggregation level (AL) within the search space (SS). According to an embodiment, the predefined search space (set) priorities and/or rules may include calculating the priority number according to the following equation:

$$p_{bd}(SS, AL) = \alpha(SS, AL) \frac{BD \text{ index } (SS, AL)}{\text{Number of } BDs \ (SS, AL)},$$

where $p_{bd}$ represents the priority number, the BD index (SS, AL) is the blind decoding index within the search space (SS) and aggregation level (AL), Number of BDs (SS, AL) is the number of blind decodings within the search space (SS) and aggregation level (AL), and $\alpha(SS, AL)$ is a priority scaler. In one example embodiment, the BD index may vary between [1, 2, Number of BDs (SS, AL)], which means that priority numbers would vary between 0 and 1 ($0 < p_{bd}(SS, AL) \leq 1$).

In certain embodiments, the predefined search space (set) priorities and/or rules may include defining the search space priority order according to one or more of the following criteria: aggregation level, search spaces or sets of search spaces or CORESETs, BD search space type (slot based, non-slot based), DCI size, and/or RNTI associated with the search space. According to some embodiments, the predefined search space (set) priorities and/or rules may include dropping BDs at the UE based on a priority order according to the component carrier and/or bandwidth part, for example, in the following order: (1) aggregation level, (2) scheduling type, (3) search space set, and (4) component carrier.

Figure 3B:
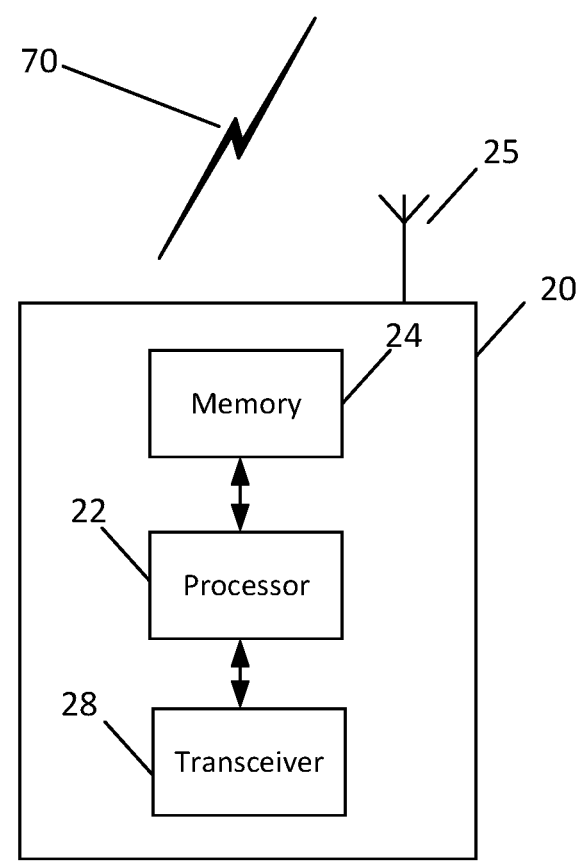
FIG. 3b illustrates a block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 3b.

As illustrated in FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an embodiment, apparatus 20 may be configured to communicate with apparatus 10 via a wireless or wired communications link 70 according to any radio access technology, such as NR.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein. According to one embodiment, apparatus 20 may be controlled by memory 24 and processor 22 to perform NR control channel (e.g., PDCCH) blind decoding attempts between multiple search spaces or sets of search space(s) or CORESETs based on predefined search space (set) priorities and/or rules. In an embodiment, as will be discussed in more detail below, when a predefined maximum number of blind decoding attempts has been reached, apparatus 20 may be controlled by memory 24 and processor 22 to reduce the number of blind decodings down to an allowed level of BDs according to the predefined search space (set) priorities and/or rules.

For example, in one embodiment, apparatus 20 may be controlled by memory 24 and processor 22 to receive configuration of BDs and/or candidates on multiple search spaces, sets of search spaces and/or CORESETs that results in monitoring occasions where a number of required blind decodings exceeds a capability of the apparatus. According to an embodiment, apparatus 20 may then be controlled by memory 24 and processor 22 to identify the monitoring occasions for which the blind decoding capability of the apparatus is exceeded and to reduce the set of blind decodings or candidates based on the predefined search space (set) priorities and/or rules. In one embodiment, apparatus 20 may be further controlled by memory 24 and processor 22 to receive PDCCH(s) given the reduced set of blind decodings or candidates.

In one embodiment, when it is determined that the number of required blind decodings exceeds the maximum BD capability of the apparatus 20, apparatus 20 may be controlled by memory 24 and processor 22 to reduce the number of blind decoding attempts according to a priority number assigned to each BD and according to the predefined search space (set) priorities and/or rules. In this embodiment, the predefined search space (set) priorities and/or rules may include assigning each blind decoding candidate a priority number, and apparatus 20 may be controlled by memory 24 and processor 22 to reduce the number of BDs according to the assigned priority number. For instance, in an embodiment, apparatus 20 may be controlled by memory 24 and processor 22 to drop BD(s) with the lowest priority number(s) until the allowed or desired level is reached, i.e., until the number of BDs is below the maximum allowed BD attempts according to the capability of apparatus 20. According to such an embodiment, apparatus 20 may be controlled by memory 24 and processor 22 to drop the blind decoding attempts with lowest priority numbers until the allowed level of blind decodings is reached. In other embodiments, however, apparatus 20 may be controlled by memory 24 and processor 22 to drop BD(s) with the highest priority number(s) until the allowed or desired level is reached. If multiple BDs have the same priority number, then the predefined search space (set) priorities and/or rules may include dropping the BD with the lowest search-space (set) priority (from among the BDs with the same priority number).

In certain embodiments, a priority number within an AL of the SS may depend on a total number of blind decodings per AL within the SS. According to an embodiment, the predefined search space (set) priorities and/or rules may include calculating the priority number according to the following equation:

$$p_{bd}(SS, AL) = \alpha(SS, AL) \frac{BD \text{ index } (SS, AL)}{\text{Number of } BDs \text{ } (SS, AL)},$$

where $p_{bd}$ represents the priority number, the BD index (SS, AL) is the blind decoding index within the SS and AL, Number of BDs (SS, AL) is the number of blind decodings within the SS and AL, and $\alpha(SS, AL)$ is a priority scaler. In one example embodiment, the BD index may vary between [1, 2, Number of BDs (SS, Al)], which means that priority numbers would vary between 0 and 1 (0<$p_{bd}$ (SS, AL)≤1).

According to some embodiments, apparatus 20 may be controlled by memory 24 and processor 22 to reduce the number of BDs jointly over BDs in the multiple search spaces or search space sets or CORESETs. In other embodiments, apparatus 20 may be controlled by memory 24 and processor 22 to reduce the number of BDs sequentially in different search spaces or search space sets or CORESETs according to a search space priority. According to this sequential approach, BDs may be reduced first from the search space with the smallest search-space (set) priority, and if that is not enough, BDs may also be reduced from the search space with the second lowest search-space (set) priority and so on. In an embodiment, a maximum number or percentage of BDs that can be dropped per search space or search space set or CORESET may be defined to maintain the scheduling capability in all search spaces. In both the configuration where the reduction is done jointly or the configuration where the reduction is done sequentially, the dropping or reducing of BDs may be done based on the priority number of the BD, as discussed above.

In certain embodiments, the predefined search space (set) priorities and/or rules may include may define the search space priority order according to one or more of the following criteria: aggregation level, search spaces or sets of search space(s) or CORESETs, BD search space type (slot based, non-slot based), DCI size, and/or RNTI associated with the search space. According to some embodiments, the predefined search space (set) priorities and/or rules may include may define the priority order according to the component carrier and/or bandwidth part, for example, in the following order: (1) aggregation level, (2) scheduling type, (3) search space set, and (4) component carrier. Thus, in this embodiment, apparatus 20 may be controlled by memory 24 and processor 22 to drop BDs based on that predefined priority order.

Figure 4A:
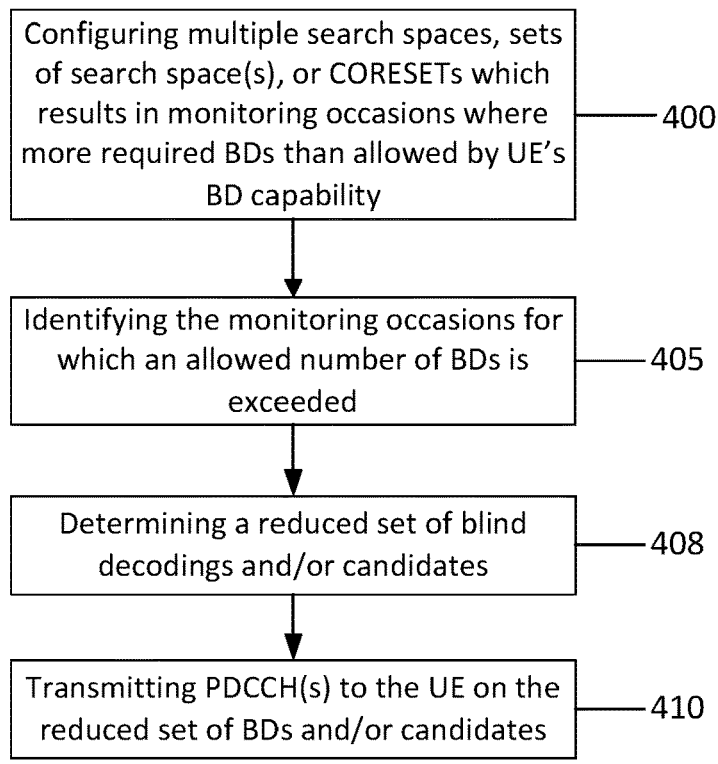
FIG. 4a illustrates an example flow diagram of a method, according to an embodiment.

FIG. 4a illustrates an example flow diagram of a method for controlling or managing NR control channel (e.g., PDCCH) blind decoding attempts between multiple search spaces or search space sets or CORESETs based on predefined search space (set) priorities and/or rules, according to an example embodiment. In one embodiment, the method may be performed by a network node, such as a base station, eNB, gNB, relay node, or access node, for example. In an embodiment, the method of FIG. 4a may include, at 400, configuring multiple search spaces, sets of search space(s), and/or CORESETs, to a UE, that results in monitoring occasions where more BDs are required than allowed by a capability of the UE. The method may then include, at 405, identifying the monitoring occasions for which an allowed number of BDs is exceeded, and, at 408, determining a reduced set of blind decodings and/or candidates. The method may then include, at 410, transmitting PDCCH(s) to the UE on the reduced set of blind decodings and/or candidates. The reduced set of blind decodings and/or candidates may be determined by the predefined search space priorities and/or rules, as discussed in detail above.

Figure 4B:
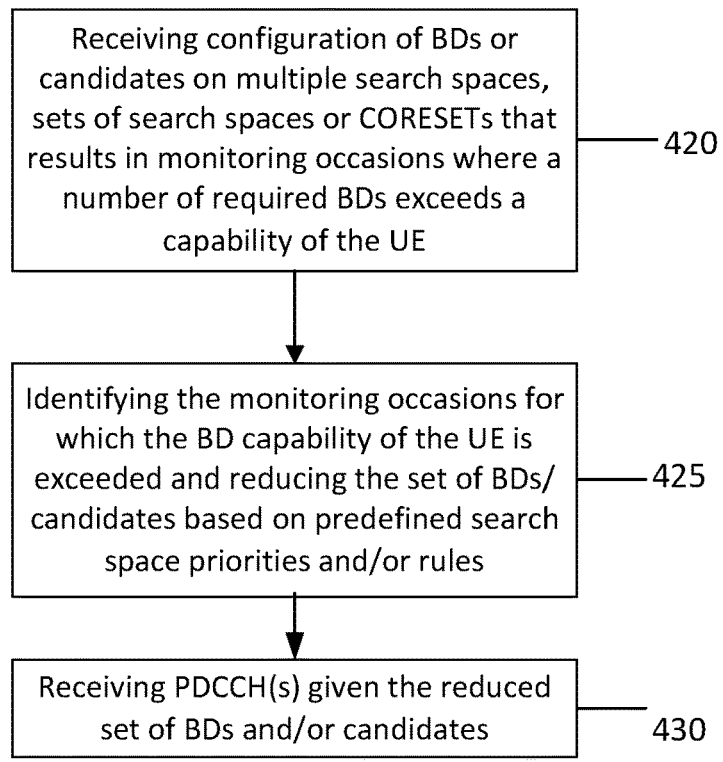
FIG. 4b illustrates an example flow diagram of a method, according to another embodiment.

FIG. 4b illustrates an example flow diagram of a method for performing NR control channel (e.g., PDCCH) blind decodings between multiple search spaces, sets of search space(s), or CORESETs based on predefined search space (set) priorities and/or rules, according to an embodiment. In one embodiment, the method of FIG. 4b may be performed by a UE or mobile station, for example. The method of FIG.

4b may include, at 420, receiving configuration of BDs or candidates on multiple search spaces, sets of search spaces or CORESETs that results in monitoring occasions where a number of required BDs exceeds a capability of the UE. The method may then include, at 425, identifying the monitoring occasions for which the BD capability of the UE is exceeded and reducing the set of blind decodings/candidates based on predefined search space priorities and/or rules. The method may also include, at 430, receiving PDCCH(s) given the reduced set of blind decodings/candidates.

Figure 4C:
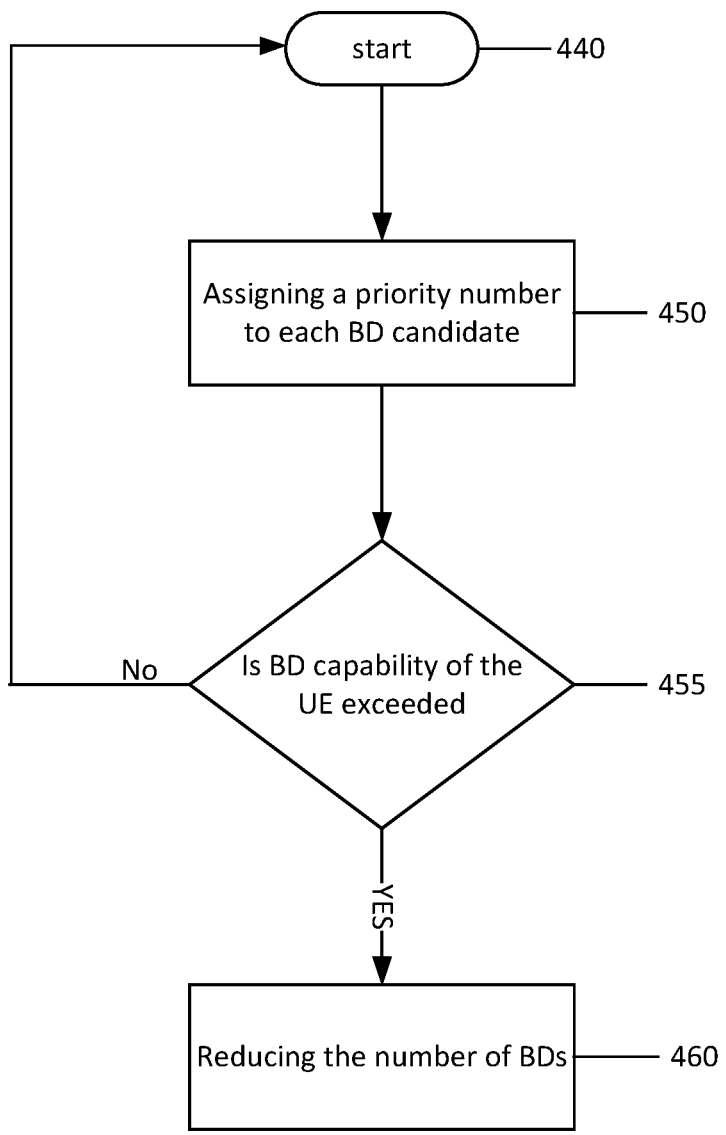
FIG. 4c illustrates an example flow diagram of a method, according to an embodiment.

FIG. 4c illustrates an example flow diagram of a method for reducing NR control channel (e.g., PDCCH) blind decodings between multiple search spaces, sets of search space(s), or CORESETs according to predefined search space (set) priorities and/or rules, according to one example embodiment. The method of FIG. 4c may begin at 440 and, at 450, may include assigning each BD and/or candidate a priority number. At 455, the method may include determining whether the configuration of multiple search spaces, sets of search space(s), or CORESETs results in monitoring occasions where more BDs are required than allowed by a capability of the UE. If so, the method may include, at 460, reducing the number of BD attempts down to an allowed level of BDs that is within the capability of the UE according to the predefined search space (set) priorities and/or rules. The predefined search space (set) priorities and/or rules may include rules configured to dynamically prioritize the BD(s) on different ones of the multiple search spaces or search space sets or CORESETs. If it is determined, at 455, that the BD capability of the UE is not exceeded, then the method may return to the start 440.

For example, in one embodiment, when it is determined that the BD capability of the UE is exceeded, step 460 of reducing the number of BD attempts may include dropping BDs based on the priority number assigned to each BD and according to the predefined search space (set) priorities and/or rules. For instance, in an embodiment, the dropping may include dropping BD(s) with the lowest priority number(s) until the allowed or desired level is reached, i.e., until the number of BDs is below the predefined maximum threshold of allowed BD attempts. In other embodiments, the dropping may include dropping BD(s) with the highest priority number(s) until the allowed or desired level is reached. It should be noted that the assigning step 450 may be optional and, in certain embodiments, may be performed before or after the determining step 455.

Therefore, embodiments of the invention provide several technical improvements, enhancements, and/or advantages. For example, as a result of certain embodiments, processing load can be reduced. Embodiments can facilitate an overbooking solution applicable to NR scenario, can scale to any NR scenario, involves a minimal amount of RRC signalling and even may be done also without any RRC signalling. In addition, according to certain embodiments, the computational complexity is small. Blind decoding(s) to be dropped can be defined in advance, or can be determined in semi-static manner; and the dropping of blind decoding(s) can be made in such that all aggregation levels are available for scheduling. As such, embodiments of the invention can improve performance and throughput of network nodes including, for example, base stations/eNBs/gNBs and UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
configuring, by a network node, multiple search spaces, sets of search spaces, and/or control resource sets, to a user equipment, that results in monitoring occasions where more blind decodings are required than allowed by capability of the user equipment;
identifying the monitoring occasions for which an allowed number of blind decodings is exceeded;
determining a reduced set of blind decodings and/or candidates, wherein the reduced set of blind decodings and/or candidates are determined by predefined search space priorities or rules;
transmitting physical downlink control channel(s) to the user equipment given the reduced set.

2. An apparatus, comprising:
at least one processor; and
at least one memory comprising computer program code, the at least one memory and computer program code configured, with the at least one processor, to cause the apparatus at least to
configure multiple search spaces, sets of search spaces, and/or control resource sets, to a user equipment, that results in monitoring occasions where more blind decodings are required than allowed by capability of the user equipment;
identify the monitoring occasions for which an allowed number of blind decodings is exceeded;
determine a reduced set of blind decodings and/or candidates, wherein the reduced set of blind decodings and/or candidates are determined by predefined search space priorities or rules;
transmit physical downlink control channel(s) to the user equipment given the reduced set.

3. The apparatus according to claim 2, wherein the predefined search space priorities or rules comprise rules configured to prioritize the blind decoding attempts on different ones of said multiple search spaces or sets of search spaces.

4. The apparatus according to claim 2, wherein the predefined search space priorities or rules comprise:
assigning a priority number to each of the blind decodings and/or candidates that are subject to potential blind decoding reduction; and
reducing the number of blind decodings according to the priority number.

5. The apparatus according to claim 4, wherein the predefined search space priorities or rules further comprise dropping the blind decodings with lowest priority numbers until the allowed level of blind decodings is reached.

6. The apparatus according to claim 4, wherein the priority number within an aggregation level (AL) of the search space (SS) depends on a total number of blind decodings per aggregation level (AL) within the search space (SS).

7. The apparatus according to claim 4, wherein the priority number is calculated according to the following equation:

$$p_{bd}(SS, AL) = \alpha(SS, AL) \frac{BD \text{ index } (SS, AL)}{\text{Number of } BDs \text{ } (SS, AL)},$$

where $p_{bd}$ represents the priority number, the BD index (SS, AL) is the blind decoding index within a search space (SS) and aggregation level (AL), Number of BDs (SS, AL) is the number of blind decodings within the search space (SS) and aggregation level (AL), and $\alpha(SS, AL)$ is a priority scaler.

8. The apparatus according to claim 4, wherein, when multiple blind decodings have the same priority number, the predefined search space priorities or rules further comprise dropping the blind decoding with a lowest search space priority.

9. The apparatus according to claim 2,
wherein an order of the search space priority is defined according to at least one of the following criteria: priority order according to aggregation level, priority order between said sets of search spaces, priority order according to blind decoding search space set type, priority order according to downlink control information (DCI) size, or priority order according to radio network temporary identifier (RNTI) associated with the search space; and
wherein the predefined search space priorities or rules further comprise dropping blind decodings at the user equipment based on a priority order according to component carrier and/or bandwidth part in the following predefined order: (1) aggregation levels, (2) scheduling types, (3) search space sets, and (4) component carriers.

10. The apparatus according to claim 2, wherein the blind decoding capability of the user equipment is determined per time slot and the identifying of the monitoring occasions is done per time slot.

11. A method, comprising:
receiving, by a user equipment, configuration of blind decodings or candidates on multiple search spaces, sets of search spaces and/or control resource sets that results in monitoring occasions where a number of required blind decodings exceeds a capability of the user equipment;
identifying the monitoring occasions for which the blind decoding capability of the user equipment is exceeded and reducing the set of blind decodings or candidates based on predefined search space priorities or rules; and
receiving, by the user equipment, physical downlink control channel(s) given the reduced set of blind decodings or candidates.

12. An apparatus, comprising:
at least one processor; and
at least one memory comprising computer program code, the at least one memory and computer program code configured, with the at least one processor, to cause the apparatus at least to
receive configuration of blind decodings or candidates on multiple search spaces, sets of search spaces and/or control resource sets that results in monitoring occasions where a number of required blind decodings exceeds a capability of the apparatus;
identify the monitoring occasions for which the blind decoding capability of the apparatus is exceeded and reduce the set of blind decodings or candidates based on predefined search space priorities or rules; and
receive physical downlink control channel(s) given the reduced set of blind decodings or candidates.

13. The apparatus according to claim 12, wherein the predefined search space priorities or rules comprise rules configured to prioritize the blind decodings on different ones of said multiple search spaces and/or sets of search spaces.

14. The apparatus according to claim 13,
wherein the apparatus is configured to reduce the number of blind decodings jointly over blind decodings in said multiple search spaces, sets of search spaces and/or control resource sets, or
wherein the apparatus is configured to reduce the number of blind decodings sequentially in different search spaces, sets of search spaces, and/or control resource sets according to the search space priority.

15. The apparatus according to claim 13,
wherein an order of the search space priority is defined according to at least one of the following criteria: priority order according to aggregation level, priority order between said sets of search spaces, priority order according to blind decoding search space set type, priority order according to downlink control information (DCI) size, or priority order according to radio network temporary identifier (RNTI) associated with the search space; or
wherein the predefined search space priorities or rules further comprise dropping blind decodings at the user equipment based on a priority order according to component carrier and/or bandwidth part in the following predefined order: (1) aggregation levels, (2) scheduling types, (3) search space sets, and (4) component carriers.

16. The apparatus according to claim 12, wherein the predefined search space priorities or rules comprise:
assigning a priority number to each of the blind decodings and/or candidates that are subject to potential blind decoding reduction; and
reducing the number of blind decodings according to the priority number.

17. The apparatus according to claim 16, wherein the predefined search space priorities or rules further comprise dropping the blind decodings with lowest priority numbers until the allowed level of blind decodings is reached.

18. The apparatus according to claim 16, wherein the priority number within an aggregation level (AL) of a search space (SS) depends on a total number of blind decodings per aggregation level (AL) within the search space (SS).

19. The apparatus according to claim 16, further comprising calculating the priority number according to the following equation:

$$p_{bd}(SS, AL) = \alpha(SS, AL) \frac{BD \text{ index } (SS, AL)}{\text{Number of } BDs \ (SS, AL)},$$

where $p_{bd}$ represents the priority number, the BD index (SS, AL) is the blind decoding index within the search space (SS) and aggregation level (AL), Number of BDs (SS, AL) is the number of blind decodings within the search space (SS) and aggregation level (AL), and $\alpha(SS, AL)$ is a priority scaler.

20. The apparatus according to claim 16, wherein, when multiple blind decodings have the same priority number, the predefined search space priorities or rules further comprise dropping the blind decoding attempts with a lowest search space priority.

* * * * *